(12) United States Patent
Hara et al.

(10) Patent No.: US 8,988,901 B2
(45) Date of Patent: Mar. 24, 2015

(54) SWITCHING POWER SUPPLY DEVICE

(71) Applicant: Murata Manufacturing Co., Ltd., Nagaokakyo-shi, Kyoto-fu (JP)

(72) Inventors: Takashi Hara, Nagaokakyo (JP); Hajime Shiji, Nagaokakyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 14/050,395

(22) Filed: Oct. 10, 2013

(65) Prior Publication Data

US 2014/0098574 A1    Apr. 10, 2014

Related U.S. Application Data

(63) Continuation of application No. PCT/JP2012/061964, filed on May 10, 2012.

(30) Foreign Application Priority Data

May 12, 2011    (JP) .................................. 2011-107441

(51) Int. Cl.
```
H02M 3/335      (2006.01)
H02M 3/337      (2006.01)
H02M 1/00       (2006.01)
```
(52) U.S. Cl.
CPC ...... *H02M 3/33507* (2013.01); *H02M 3/33592* (2013.01); *Y02B 70/1475* (2013.01); (Continued)

(58) Field of Classification Search
CPC ........... H02M 3/33592; Y02B 70/1475; Y02B 70/1433

USPC .......................... 363/21.02–21.18, 39, 41, 48
See application file for complete search history.

(56) References Cited

U.S. PATENT DOCUMENTS 7,193,866 B1 *  3/2007  Huang ............................ 363/22
7,778,048 B2 *  8/2010  Hosotani .................... 363/21.02
(Continued)

FOREIGN PATENT DOCUMENTS

JP      10-164837 A    6/1998
JP      2005-045965 A  2/2005
(Continued)

OTHER PUBLICATIONS

Official Communication issued in International Patent Application No. PCT/JP2012/061964, mailed on Aug. 14, 2012.

*Primary Examiner* — Adolf Berhane
*Assistant Examiner* — Yemane Mehari
(74) *Attorney, Agent, or Firm* — Keating & Bennett, LLP

(57) ABSTRACT

A switching power supply includes a series resonant circuit that includes a resonant inductor and a resonant capacitor connected in series with a primary winding of a converter transformer. By controlling turning on and off of first and second switching elements in a complementary manner, current is supplied to the series resonant circuit. A third switching element connected on the secondary side of the converter transformer is synchronized with the first switching element, and a fourth switching element is synchronized with the second switching element. If a switching frequency is less than a resonant frequency, turning on of the third and fourth switching elements is synchronized with turning on of the first and second switching elements, and turning off of the third and fourth switching elements is controlled, without being synchronized with turning off of the first and second switching elements, after half a resonant period has elapsed.

18 Claims, 10 Drawing Sheets

(52) U.S. Cl.
CPC ..... *H02M3/3376* (2013.01); *H02M 2001/0058* (2013.01); *Y02B 70/1433* (2013.01); *Y02B 70/1491* (2013.01)
USPC .................................................. 363/21.02

(56) References Cited

U.S. PATENT DOCUMENTS

2009/0086512 A1* 4/2009 Fahlenkamp et al. ...... 363/21.06
2009/0175056 A1 7/2009 Choi
2010/0067262 A1 3/2010 Chen et al.

FOREIGN PATENT DOCUMENTS

| JP | 2005-198438 A | 7/2005 |
|----|---------------|--------|
| JP | 3126122 U | 10/2006 |
| JP | 2007-274789 A | 10/2007 |
| JP | 2008-301680 A | 12/2008 |
| JP | 2010-098935 A | 4/2010 |

* cited by examiner

SWITCHING POWER SUPPLY DEVICE

BACKGROUND OF THE INVENTION

1. Field of the Invention

The present invention relates to switching power supplies of synchronous-rectification LLC resonant converters.

2. Description of the Related Art

Conventionally, switching power supply devices including various types of synchronous-rectification LLC resonant converters have been designed.

FIG. 1 is a circuit diagram of a switching power supply device described in Japanese Unexamined Patent Application Publication No. 2007-274789. The switching power supply device described in Japanese Unexamined Patent Application Publication No. 2007-274789 is an LLC resonant converter. As illustrated in FIG. 1, in the switching power supply described in Japanese Unexamined Patent Application Publication No. 2007-274789, a current transformer is connected in series to an inductor including a primary winding of a transformer, a resonant inductor, and a resonant capacitor. Current flowing to a resonant circuit, that is, current flowing to the primary winding, is detected by the current transformer. The detected current is input to a drive circuit, and the drive circuit controls turning on and off of a secondary-side switching element (synchronization rectification element), on the basis of the detected current.

FIG. 2 is a circuit diagram illustrating a switching power supply device described in Japanese Registered Utility Model No. 3126122. The switching power supply device described in Japanese Registered Utility Model No. 3126122 is a synchronous-rectification LLC resonant converter of a half bridge type. As illustrated in FIG. 2, in the switching power supply device described in Japanese Registered Utility Model No. 3126122, a control circuit is provided on the secondary side. The control circuit controls turning on and off of a primary-side switching element as well as a secondary-side switching element. At this time, after electrical conduction of the primary-side switching element is achieved, the control device allows electrical conduction of the secondary-side switching element when a predetermined time interval (for example, 0.4 microseconds) has passed. Furthermore, after disconnection of the primary-side switching element is achieved, the control device allows disconnection of the secondary-side switching element when a predetermined time interval (for example, 0.15 microseconds) has passed. That is, the control circuit of the switching power supply device described in Japanese Registered Utility Model No. 3126122 controls turning on and off of the primary-side switching element and the secondary-side switching element (synchronization rectification element), with a predetermined time interval between the control for the primary-side switching element and the control for the secondary-side switching element.

As described above, the switching power supply devices described in Japanese Unexamined Patent Application Publication No. 2007-274789 and Japanese Registered Utility Model No. 3126122 control turning on and off of a secondary-side switching element (synchronous rectification element) using different methods. However, in the switching power supply device described in Japanese Unexamined Patent Application Publication No. 2007-274789, in order to drive the secondary-side switching element (synchronous rectification element), a current transformer that detects current of a resonant circuit, that is, current flowing to a primary winding, needs to be provided, thus increasing the number of component elements of the switching power supply device.

Furthermore, in order to generate and supply a driving signal for the synchronous rectification element, a high-accuracy, high-speed comparator needs to be provided. Accordingly, the configuration of the switching power supply device becomes complicated, thus generating a problem such as increase in the cost.

Furthermore, as described in Japanese Registered Utility Model No. 3126122, in the configuration in which turning on and off of a primary-side switching element and a secondary-side switching element (synchronous rectification element) is controlled, with a predetermined time interval between the control for the primary-side switching element and the control for the secondary-side switching element, in the case where a switching frequency is lower than the resonant frequency of a resonant circuit, negative current flows when the secondary-side switching element (synchronous rectification element) is turned on. Thus, reverse current toward the primary side may be generated.

SUMMARY OF THE INVENTION

Accordingly, preferred embodiments of the present invention provide a switching power supply device including a resonant converter that does not generate reverse current from a secondary side toward a primary side.

A switching power supply device according to a preferred embodiment of the present invention includes a converter transformer including a primary winding, a first secondary winding, and a second secondary winding; and a series resonant circuit including a resonant inductor and a resonant capacitor that are connected in series with the primary winding. The switching power supply device includes a first switching element and a second switching element that supply electric power to the series resonant circuit by being subject to on/off control in a complementary manner with each other; a third switching element that is connected in series between the first secondary winding and a voltage output terminal; and a fourth switching element that is connected in series between the second secondary winding and the voltage output terminal. The switching power supply device includes a controller that performs PFM control for the first switching element and the second switching element in accordance with output voltage and that controls the third switching element and the fourth switching element. The controller handles a variable A1, which is determined on the basis of a predetermined resonant period, a variable A2, which is generated on the basis of the output voltage and determines a switching period, and a variable A3, which determines turned-on times of the third switching element and the fourth switching element, and determines the turned-on times of the third switching element and the fourth switching element, on the condition that, for a region in which A1 is greater than A2/2, A3 is equal to A2/2, and for a region in which A1 is smaller than or equal to A2/2, A3 is equal to A1.

With this configuration, even when the turned-on time of each of the first switching element and the second switching element on the primary side of the converter transformer is longer than the time based on the predetermined resonant period, the turned-on time of each of the third switching element and the fourth switching element on the secondary side of the converter transformer is limited to the time based on the predetermined resonant period. Accordingly, a situation in which negative current flows in the state in which the third switching element and the fourth switching element on the secondary side are turned on is prevented, and generation of reverse current from the secondary side toward the primary side is prevented.

Furthermore, in the switching power supply device according to a preferred embodiment of the present invention, it is preferable that the predetermined resonant period is half or about half of a resonant period of the series resonant circuit.

With this configuration, even when the turned-on time of each of the first switching element and the second switching element on the primary side of the converter transformer is longer than the time that is half or about half of the resonant period of the series resonant circuit, the turned-on time of each of the third switching element and the fourth switching element on the secondary side of the converter transformer is limited to the time that is half or about half of the resonant period of the series resonant circuit. Accordingly, a situation in which negative current flows in the state in which the third switching element and the fourth switching element on the secondary side are turned on does not occur, and reverse current from the secondary side is not generated.

Furthermore, in the switching power supply device according to a preferred embodiment of the present invention, turning on of the third switching element may be in synchronization with turning on of the first switching element, the third switching element may be turned off by, whichever the earlier, a time at which the second switching element is turned on, or a time after the time half the resonant period of the series resonant circuit has passed since the turning on of the third switching element, turning on of the fourth switching element may be in synchronization with the turning on of the second switching element, and the fourth switching element is turned off by, whichever the earlier, a time at which the first switching element may be turned on, or a time after the time half the resonant period of the series resonant circuit has passed since the turning on of the fourth switching element. Accordingly, a situation in which negative current flows in the state in which the third switching element and the fourth switching element on the secondary side are turned on does not occur, and reverse current from the secondary side is not generated.

Furthermore, the switching power supply device according to a preferred embodiment of the present invention may further include a parallel inductor that is connected in parallel to the primary winding. Accordingly, a second resonant period can be designed using the resonant inductor, the resonant capacitor, and the parallel inductor, current flowing to the transformer is significantly reduced, and heat generation in the transformer is significantly reduced.

Furthermore, in the switching power supply device according to a preferred embodiment of the present invention, it is preferable that the controller includes an MPU that performs the PFM control based on the output voltage, and a driver circuit that generates a driving signal for each of the switching elements, on the basis of driving information for the switching element acquired from the MPU. With this configuration, the controller can be implemented by a digital IC, for example, as much as possible.

Furthermore, for example, the switching power supply device according to a preferred embodiment of the present invention can have the circuit configuration explained below. The first switching element and the second switching element are connected in series between first and second power supply input terminals that define a pair of terminals to which direct current voltage is input. The series resonant circuit is connected in parallel to any one of the first switching element and the second switching element. Accordingly, the primary side of the converter transformer is configured to be a half bridge type. With this configuration, a synchronous-rectification LLC resonant converter of a half bridge type can be implemented.

Furthermore, for example, the switching power supply device according to a preferred embodiment of the present invention may have the circuit configuration explained below. The first switching element and the second switching element are connected in series between first and second power supply input terminals that define a pair of terminals to which direct current voltage is input. A first capacitor and a second capacitor are connected in series between the first and second power supply input terminals, in parallel to a series circuit including the first switching element and the second switching element. By connecting the primary winding and the resonant inductor between a connection point of the first switching element and the second switching element, and a connection point of the first capacitor and the second capacitor, the series resonant circuit is provided. Accordingly, the primary side of the converter transformer is preferably configured to be a half bridge type. With this configuration, a synchronous-rectification LLC resonant converter of a half bridge type is implemented.

Furthermore, for example, the switching power supply device according to a preferred embodiment of the present invention can have the configuration explained below. The first switching element and the second switching element are connected in series between first and second power supply input terminals that define a pair of terminals to which direct current voltage is input. A fifth switching element and a sixth switching element are connected in series between the first and second power supply input terminals, in parallel to a series circuit including the first switching element and the second switching element. By connecting the primary winding and the resonant inductor between a connection point of the first switching element and the second switching element, and a connection point of the fifth switching element and the sixth switching element, the series resonant circuit is provided. Accordingly, the primary side of the converter transformer is configured to be a full bridge type. With this configuration, a synchronous-rectification LLC resonant converter of a full bridge type is implemented.

According to various preferred embodiments of the present invention, since secondary-side switching elements are properly controlled, generation of reverse current from the secondary side toward the primary side is prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Switching power supplies according to preferred embodiments of the present invention will be described with reference to the drawings.

First Preferred Embodiment

Figure 1:
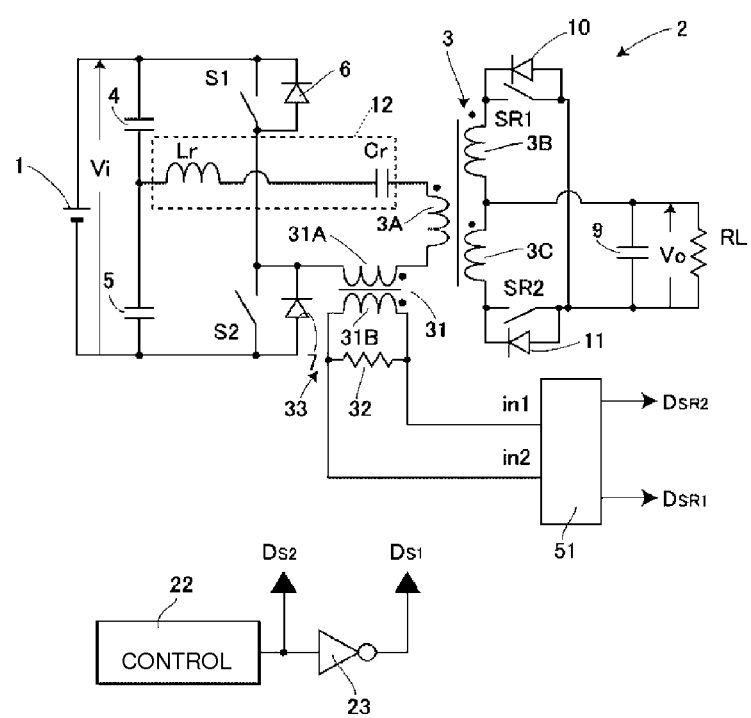
FIG. 1 is a circuit diagram of a switching power supply device described in Japanese Unexamined Patent Application Publication No. 2007-274789, which is a related art.
Figure 2:
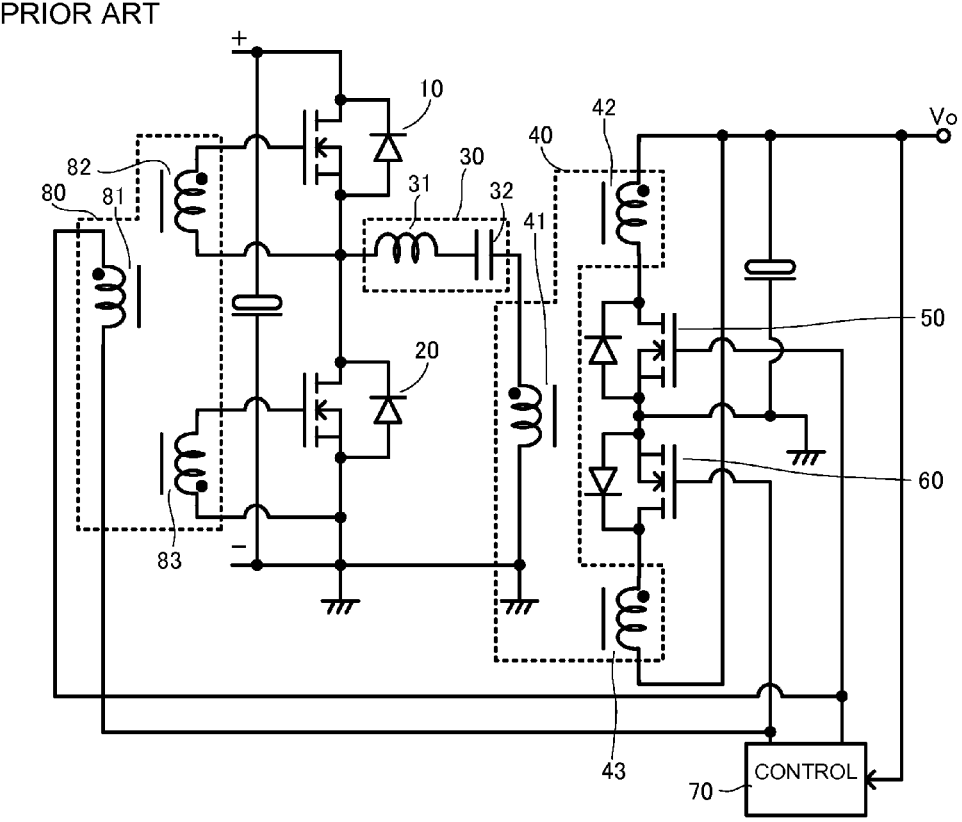
FIG. 2 is a circuit diagram of a switching power supply device described in Japanese Registered Utility Model No. 3126122, which is a related art.
Figure 3:
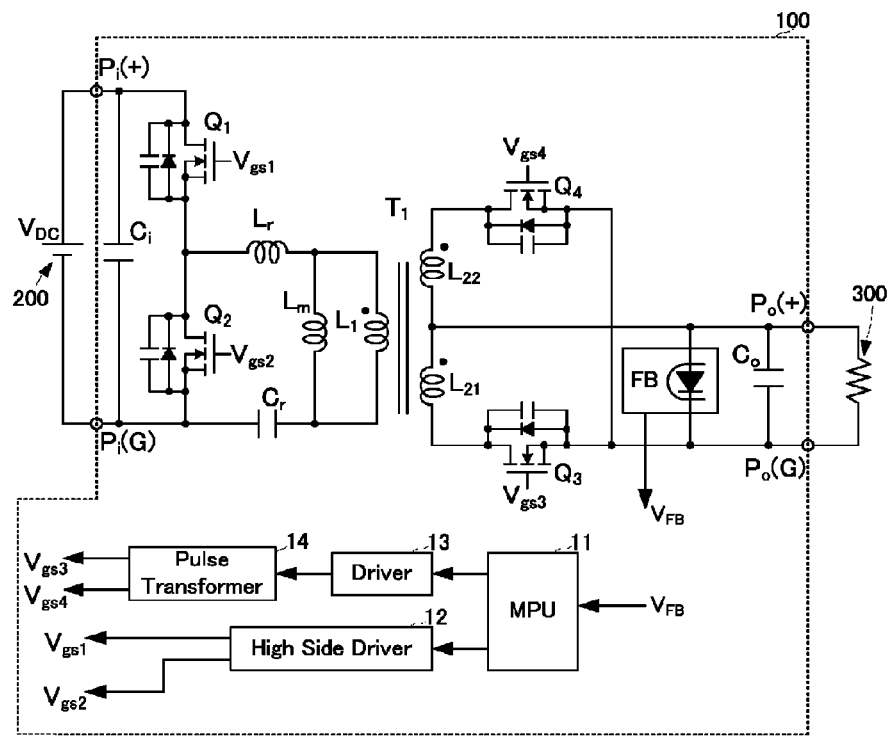
FIG. 3 is a circuit diagram of a switching power supply device 100 according to a first preferred embodiment of the present invention.

FIG. 3 is a circuit diagram of a switching power supply device 100 according to a first preferred embodiment of the present invention.

The switching power supply device 100 includes power supply input terminals, which are a pair of terminals, connected to a current power supply 200. A first power supply input terminal $P_i(+)$ is provided on a high potential side, and a second power supply input terminal $P_i(G)$ is provided on a ground potential side.

The switching power supply device 100 includes output terminals, which are a pair of terminals connected to load 300. A first output terminal $P_O(+)$ is provided on a high potential side, and a second output terminal $P_o(G)$ is provided on a ground potential side.

An input capacitor $C_i$ that smoothes input voltage is connected between the first power supply input terminal $P_i(+)$ and the second power supply input terminal $P_i(G)$.

A series circuit including a first switching element $Q_1$ and a second switching element $Q_2$, is connected between the first power supply input terminal $P_i(+)$ and the second power supply input terminal $P_i(G)$. Here, the series circuit is connected between the first power supply input terminal $P_i(+)$ and the second power supply input terminal $P_i(G)$ in such a manner that the first switching element $Q_1$ is arranged on the side of the first power supply input terminal $P_i(+)$ and the second switching element $Q_2$ is arranged on the side of the second power supply input terminal $P_i(G)$.

The first switching element $Q_1$ and the second switching element $Q_2$ are FET switching elements and each include a parasitic capacitor and a body diode.

The drain of the first switching element $Q_1$ is connected to the first power supply input terminal $P_i(+)$, and the source of the first switching element $Q_1$ is connected to the drain of the second switching element $Q_2$. The source of the second switching element $Q_2$ is connected to the second power supply input terminal $P_i(G)$. The gate of each of the first switching element $Q_1$ and the second switching element $Q_2$ is connected to a high side driver 12.

A series circuit including a resonant inductor $L_r$, a primary winding $L_1$ of a converter transformer $T_1$, and a resonant capacitor $C_r$ is connected in parallel to the second switching element $Q_2$. Furthermore, an excitation inductor $L_m$ is connected in parallel to the primary winding $L_1$. The resonant inductor $L_r$, the excitation inductor $L_m$, and the resonant capacitor $C_r$ define a resonant circuit of an LLC resonant converter. The resonant inductor $L_r$ and the excitation inductor $L_m$ may include a leakage inductor of the converter transformer $T_1$ and an excitation inductor or may be configured by connecting inductors in series with or parallel to the primary winding $L_1$, for example.

The converter transformer $T_1$ includes a first secondary winding $L_{21}$ and a second secondary winding $L_{22}$ that are magnetically coupled to the primary winding $L_1$, as well as the above-mentioned primary winding $L_1$. The first secondary winding $L_{21}$ and the second secondary winding $L_{22}$ are connected to each other so as to have the same polarity with respect to the primary winding $L_1$.

The connection point of the first secondary winding $L_{21}$ and the second secondary winding $L_{22}$ is connected to the first output terminal $P_O(+)$.

The end portion of the first secondary winding $L_{21}$ that is opposite to the above-mentioned connection point is connected to the second output terminal $P_o(G)$ via a third switching element $Q_3$. Here, the drain of the third switching element $Q_3$ is connected to the first secondary winding $L_{21}$, and the source of the third switching element $Q_3$ is connected to the second output terminal $P_o(G)$. The gate of the third switching element $Q_3$ is connected to a pulse transformer 14. The pulse transformer 14 corresponds to a second insulating signal transmitting device.

The end portion of the second secondary winding $L_{22}$ that is opposite the above-mentioned connection point is connected to the second output terminal $P_o(G)$ via a fourth switching element $Q_4$. Here, the drain of the fourth switching element $Q_4$ is connected to the second secondary winding $L_{22}$, and the source of the fourth switching element $Q_4$ is connected to the second output terminal $P_o(G)$. The gate of the fourth switching element $Q_4$ is connected to the pulse transformer 14.

The third switching element $Q_3$ and the fourth switching element $Q_4$ preferably are FET switching elements and each include a parasitic capacitor and a body diode.

A smoothing output capacitor $C_o$ is connected between the first output terminal $P_O(+)$ and the second output terminal $P_o(G)$.

A feedback circuit FB that detects output voltage and generates a feedback signal is connected in parallel to the output capacitor $C_o$.

Figure 4:
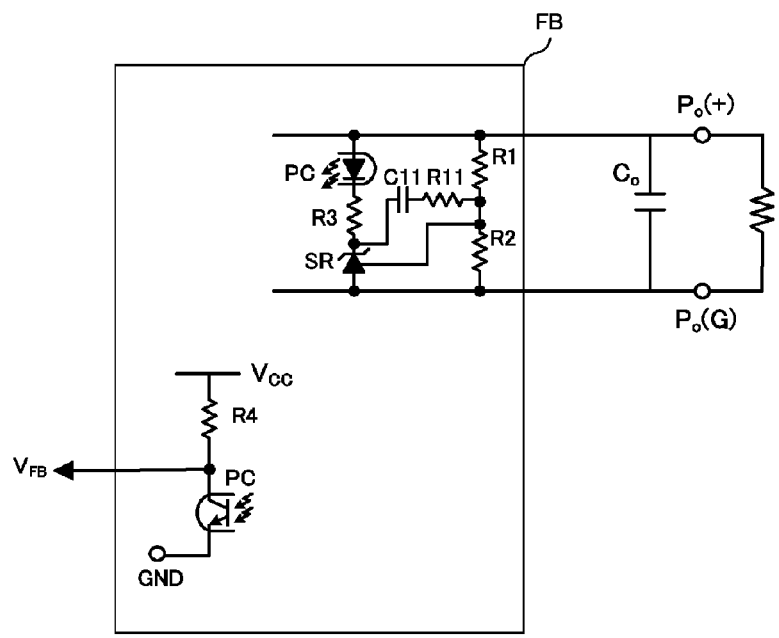
FIG. 4 is a circuit diagram of a feedback circuit FB in FIG. 3.

FIG. 4 is a circuit diagram of the feedback circuit FB. A series circuit including a shunt regulator SR, a resistor R3, and a light-emitting element of a photo-coupler PC, and a voltage-dividing circuit including resistors R1 and R2, are connected between the first output terminal $P_O(+)$ and the second output terminal $P_o(G)$. A reference terminal of the shunt regulator SR is provided with divided voltage output from the resistor voltage-dividing circuit including the resistors R1 and R2. A negative feedback circuit including a resistor R11 and a capacitor C11 is provided between a voltage control end and the reference terminal of the shunt regulator SR. One end of a light-receiving element of the photo-coupler PC is connected to a constant voltage Vcc via a resistor R4, and the other end to the GND. The voltage at the connection point of the light-receiving element of the photo-coupler PC and the resistor R4 is input as a feedback voltage $V_{FB}$ to an MPU 11. Although not illustrated specifically, the feedback voltage $V_{FB}$ is input to an AD converter arranged inside the MPU 11.

The feedback circuit FB operates according to the relationship in which the feedback voltage $V_{FB}$ decreases as output voltage of the first output terminal $P_o(+)$ the second output terminal $P_o(G)$ becomes higher than a set voltage.

The photo-coupler corresponds to a first insulating signal transmitting device.

The MPU 11, which serves as a controller, is connected to the high side driver 12 and a driver 13. The driver 13 is connected to the pulse transformer 14.

The MPU 11 calculates the switching frequency $f_s$ of each of a first switching control signal (hereinafter, simply referred to as a first control signal) and a second switching control signal (hereinafter, simply referred to as a second control signal), under PFM (Pulse Frequency Modulation) control, on the basis of the feedback voltage $V_{FB}$. The first control signal is a control signal to be supplied to the first switching element $Q_1$, and the second control signal is a control signal to be supplied to the second switching element $Q_2$. The MPU 11 supplies the first control signal and the second control signal based on the switching frequency $f_s$ to the high side driver 12.

The PFM control represents control to set the switching frequency $f_s$, which is used to control turning on and off of a switching element, to be lower when load is high and setting the switching frequency $f_s$ to be higher when load is low.

At this time, the MPU 11 generates the first control signal and the second control signal in the form of rectangular waves having two values, Hi and Low. The MPU 11 outputs the first control signal and the second control signal in such a manner that the first control signal and the second control signal are in the Hi state and the Low state in a complimentary manner with each other. Furthermore, the MPU 11 outputs the first control signal and the second control signal in such a manner that a specific dead time in which both the first control signal and the second control signal enter the Low state occurs at a timing when switching between Hi and Low is performed for the first control signal and the second control signal.

The high side driver 12 amplifies the first control signal and the second control signal output from the MPU 11 so that the first switching element $Q_1$ and the second switching element $Q_2$ is driven. The high side driver 12 supplies the first control signal to the first switching element $Q_1$ and supplies the second control signal to the second switching element $Q_2$.

Turning on and off of the first switching element $Q_1$ is controlled on the basis of the voltage $V_{gs1}$ of the first control signal applied to the gate thereof. Turning on and off of the second switching element $Q_2$ is controlled on the basis of the voltage $V_{gs2}$ of the second control signal applied to the gate thereof. As described above, since switching between Hi and Low is performed for the first control signal and the second control signal in a complementary manner with each other across a dead time (corresponding to $t_{d1}$ in FIGS. 5, 6, and 7), turning on and off of the first switching element $Q_1$ and the second switching element $Q_2$ is controlled in a complementary manner with each other across a dead time, in which both the first switching element $Q_1$ and the second switching element $Q_2$ are turned off. Here, it is desirable that the turned-on time of the first control signal and the turned-on time of the second control signal are substantially the same.

Furthermore, the MPU 11 supplies to the driver 13 a third switching control signal (hereinafter, simply referred to as a third control signal) and a fourth switching control signal (hereinafter, simply referred to as a fourth control signal) that are synchronized with turning on of the first control signal and the second control signal. The third control signal is a control signal to be supplied to the third switching element $Q_3$, and the fourth control signal is a control signal to be supplied to the fourth switching element $Q_4$.

The driver 13 amplifies the third control signal, which is a signal supplied from the MPU 11 and is turned on in synchronization with the first control signal, and amplifies the fourth control signal, which is turned on in synchronization with the second control signal. The driver 13 outputs the third control signal and the fourth control signal to the pulse transformer 14.

The MPU 11 generates the third control signal and the fourth control signal in such a manner that the turned-on time of each of the third control signal and the fourth control signal is set to a time that is half the resonant period $T_r$ (=$1/f_r$) based on the resonant frequency $f_r$ in a case where the switching frequency $f_s$ is lower than the resonant frequency $f_r$ of the series resonant circuit. The third control signal output from the pulse transformer 14 is applied to the gate of the third switching element $Q_3$. The fourth control signal output from the pulse transformer 14 is applied to the gate of the fourth switching element $Q_4$.

Turning on and off of the third switching element $Q_3$ is controlled on the basis of the voltage $V_{gs3}$ of the third control signal applied to the gate thereof. Turning on and off of the fourth switching element $Q_4$ is controlled on the basis of the voltage $V_{gs4}$ of the fourth control signal applied to the gate thereof.

Accordingly, turning on and off of the third switching element $Q_3$ is controlled in synchronization with the first switching element $Q_1$ unless the switching frequency $f_s$ is lower than the resonant frequency $f_r$ of the series resonant circuit. Turning on and off of the fourth switching element $Q_4$ is controlled in synchronization with the second switching element $Q_2$ unless the switching frequency $f_s$ is lower than the resonant frequency $f_r$ of the series resonant circuit.

In contrast, in the case where the switching frequency $f_s$ is lower than the resonant frequency $f_r$ of the series resonant circuit, although turning on of the third switching element $Q_3$ is controlled in synchronization with turning on of the first switching element $Q_1$, the third switching element $Q_3$ is turned off at a timing earlier than turning off of the first switching element $Q_1$, that is, when a time that is half the resonant period $T_r$ has passed since the turning on. In the case where the switching frequency $f_s$ is lower than the resonant frequency $f_r$ of the series resonant circuit, although turning on of the fourth switching element $Q_4$ is controlled in synchronization with turning on of the second switching element $Q_2$, the fourth switching element $Q_4$ is turned off at a timing earlier than turning off of the second switching element $Q_2$, that is, when a time that is half the resonant period $T_r$ has passed since the turning on.

A method of how to generate driving pulses of the first switching element $Q_1$, the second switching element $Q_2$, the third switching element $Q_3$, and the fourth switching element $Q_4$ will now be explained with reference to FIGS. 5A and 5B. Here, setting and operation of a digital PWM module arranged inside the MPU 11 will be explained.

Figure 5A:
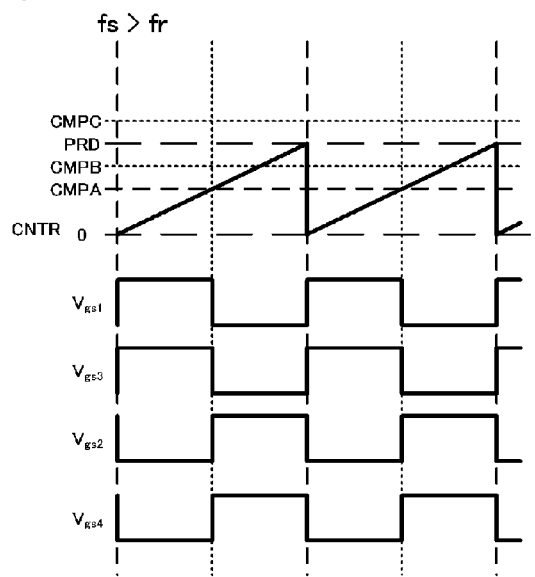
FIGS. 5A and 5B are diagrams illustrating a method for generating driving pulses for a first switching element $Q_1$, a second switching element $Q_2$, a third switching element $Q_3$, and a fourth switching element $Q_4$.
Figure 5B:
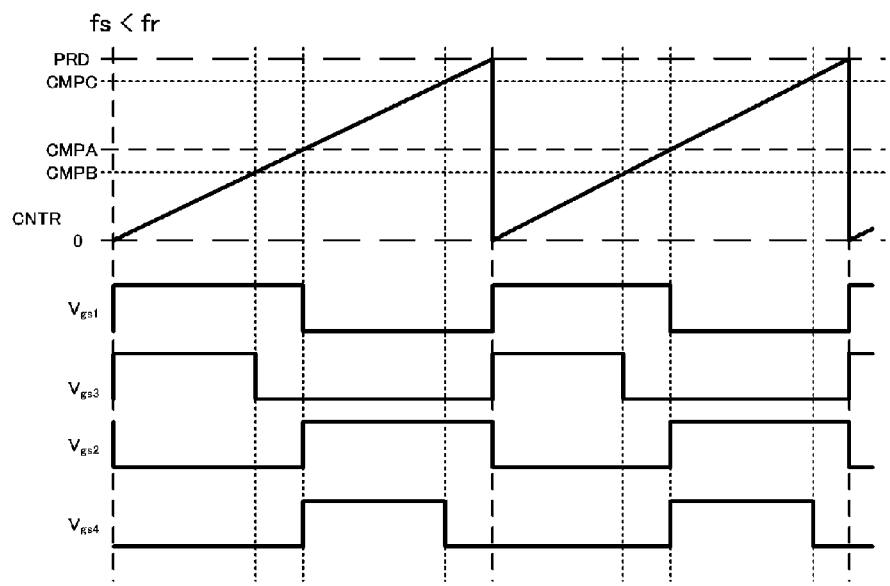

Referring to FIGS. 5A and 5B, CNTR represents a counter whose value increases with every clock cycle. PRD represents a period, which becomes zero when the value of the CNTR reaches the value of the PRD. That is, the PRD determines a switching period. CMPA, CMPB, and CMPC are thresholds for setting time. The CMPA is half the value of the PRD. The CMPB represents a fixed value and is set in such a manner that the period from the time at which the CNTR exhibits zero to the time at which the value of the CNTR reaches the CMPB is half the resonant period $T_r$. The CMPC represents a value (CMPA+CMPB), which is obtained by adding the CMPB to the CMPA.

$V_{gs1}$ represents a gate driving pulse of the first switching element $Q_1$, $V_{gs2}$ represents a gate driving pulse of the second switching element $Q_2$, $V_{gs3}$ represents a gate driving pulse of the third switching element $Q_3$, and $V_{gs4}$ represents a gate driving pulse of the fourth switching element $Q_4$. $V_{gs1}$ is set to rise when the value of the CNTR is equal to zero and to fall when the value of CNTR is equal to the CMPA. $V_{gs2}$ is set to rise when the value of the CNTR is equal to the CMPA and to fall when the value of the CNTR is equal to the value of the PRD. $V_{gs3}$ is set to rise when the value of the CNTR is equal to zero and to fall when the value of the CNTR is equal to the CMPA or the CMPB. $V_{gs4}$ is set to rise when the value of the CNTR is equal to the CMPB and to fall when the value of the CNTR is equal to the value of the PRD or the CMPC.

FIG. 5A illustrates the case where the switching frequency $f_s$ is higher than the resonant frequency $f_r$ of the series resonant circuit. The CMPA is lower than the CMPB, and the value of the PRD is lower than the CMPC. Thus, $V_{gs1}$ and $V_{gs3}$ rise at the same timing and fall at the same timing. Furthermore, $V_{gs2}$ and $V_{gs4}$ rise at the same timing and fall at the same timing.

FIG. 5B illustrates the case where the switching frequency $f_s$ is lower than the resonant frequency $f_r$ of the series resonant circuit. The CMPA is higher than the CMPB, and the value of the PRD is higher than the CMPC. Thus, although $V_{gs1}$ and $V_{gs3}$ rise at the same timing (zero), $V_{gs3}$ falls when the value of the CNTR is equal to the CMPB and $V_{gs1}$ falls when the value of the CNTR is equal to the CMPA. Since the CMPB is set in such a manner that the period from the time at which the value of the PRD is equal to zero to the time at which the value of the PRD reaches the CMPB is half the resonant period $T_r$, $V_{gs3}$ falls when the time that is half the resonant period $T_r$ has passed.

In contrast, although $V_{gs2}$ and $V_{gs4}$ rise at the same timing (CMPA), $V_{gs4}$ falls when the value of the CNTR is equal to the CMPC and $V_{gs2}$ falls when the value of the CNTR is equal to the value of the PRD. Here, the CMPC is a value (CMPA+CMPB) that is obtained by adding the CMPB to the CMPA, and the time from the CMPA to the CMPC is set to be equal to the time that is half or about half of the resonant period $T_r$. That is, $V_{gs4}$ falls when the time that is half the resonant period $T_r$ has passed.

Figure 6:
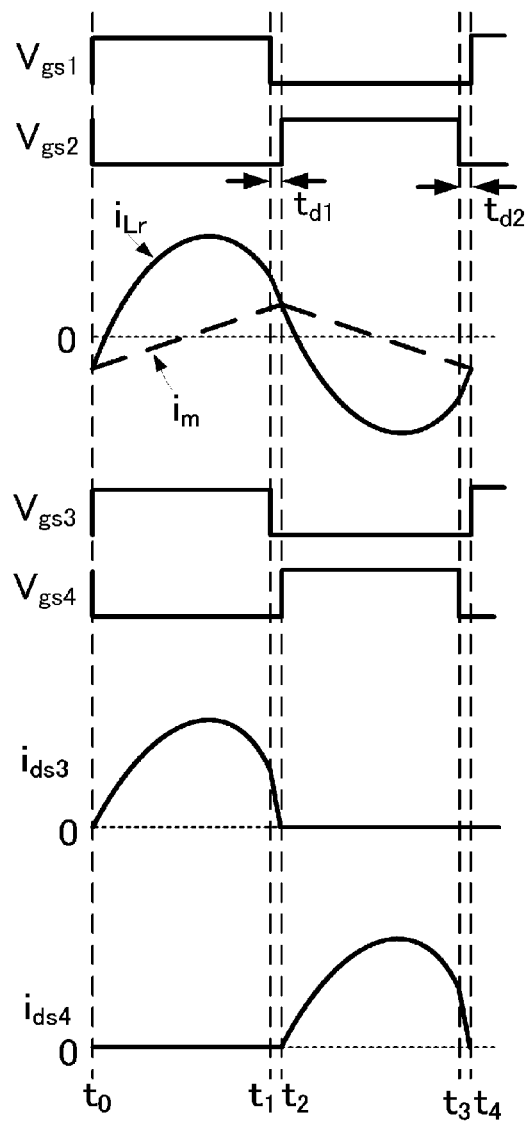
FIG. 6 is a waveform chart for explaining control performed in the state in which switching frequency $f_s$ is higher than resonant frequency $f_r$.
Figure 7:
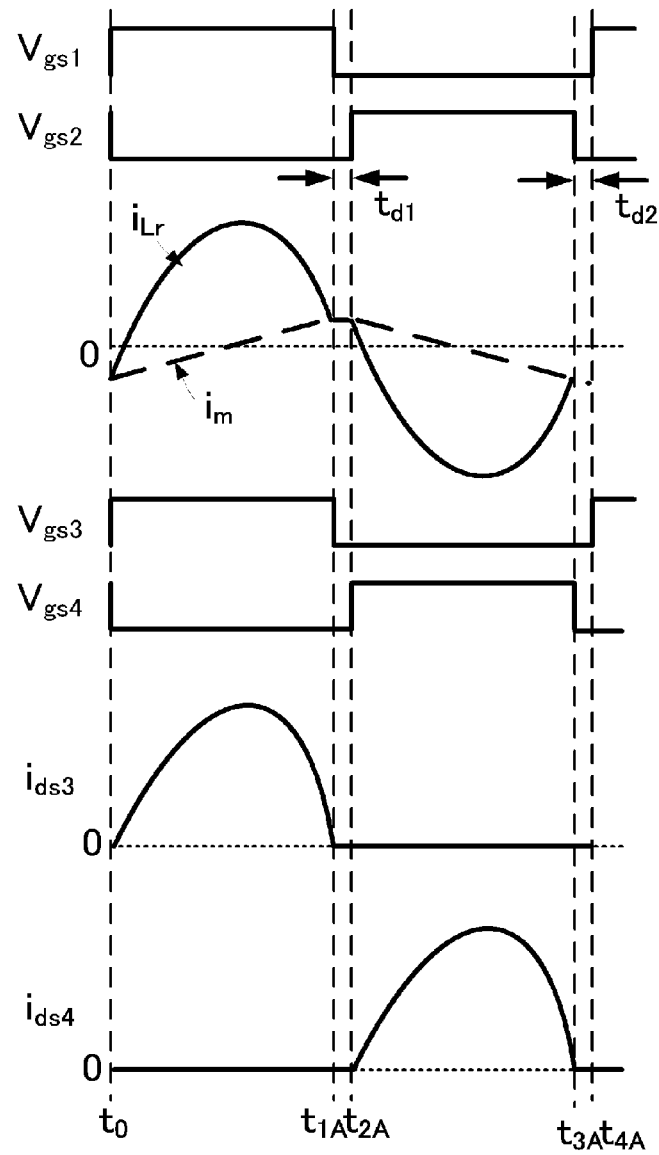
FIG. 7 is a waveform chart for explaining control performed in the state in which the switching frequency $f_s$ is equal to the resonant frequency $f_r$.
Figure 8:
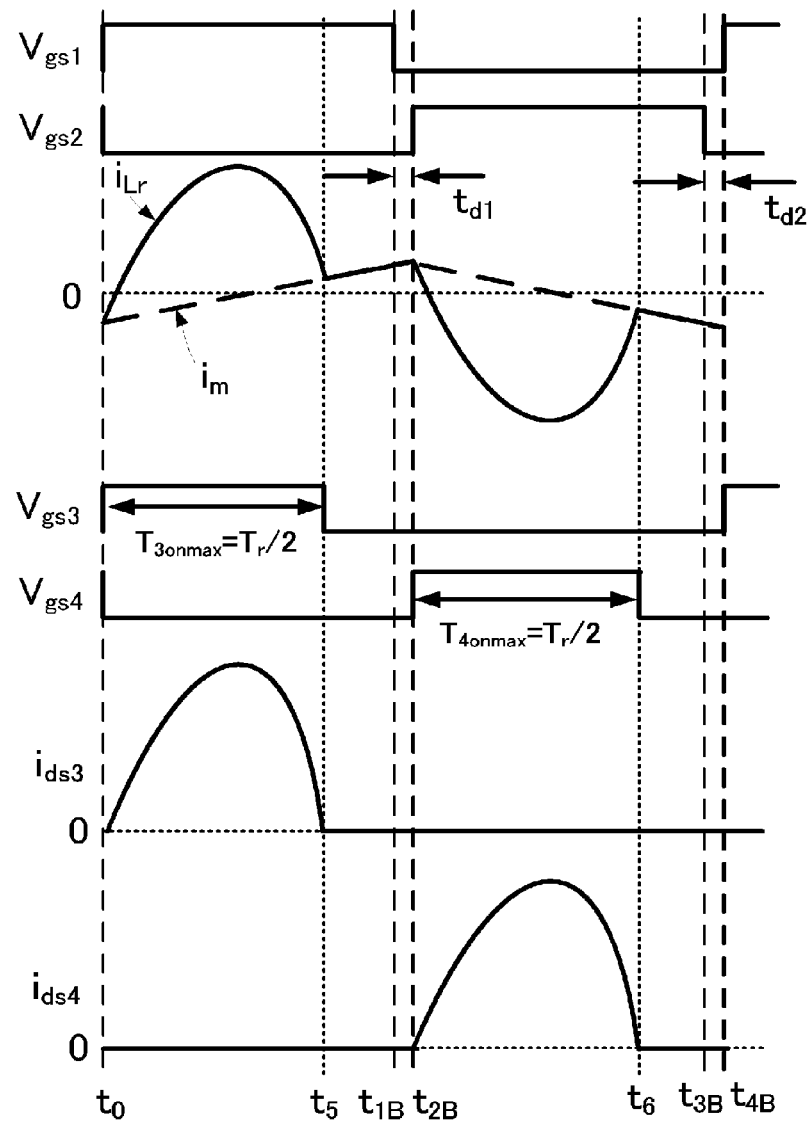
FIG. 8 is a waveform chart for explaining control performed in the state in which the switching frequency $f_s$ is lower than the resonant frequency $f_r$.

Control for electric power supply performed by the switching power supply according to this preferred embodiment will now be explained with reference to FIGS. 6, 7, and 8. FIG. 6 is a waveform chart for explaining control performed in the state in which the switching frequency $f_s$ is higher than the resonant frequency $f_r$. FIG. 7 is a waveform chart for explaining control performed in the state in which the switching frequency $f_s$ is equal to the resonant frequency $f_r$. FIG. 8 is a waveform chart for explaining control performed in the state in which the switching frequency $f_s$ is lower than the resonant frequency $f_r$. FIGS. 6, 7, and 8 each illustrate a single switching period. The switching control illustrated in FIG. 6, 7, or 8 is performed continuously.

In each of FIGS. 6, 7, and 8, $V_{gs1}$ represents the voltage of the first control signal, $V_{gs2}$ represents the voltage of the second control signal, $V_{gs3}$ represents the voltage of the third control signal, and the $V_{gs4}$ represents the voltage of the fourth control signal. Furthermore, $i_{Lr}$ represents resonant current flowing to the resonant inductor $L_r$, and $i_m$ represents excitation current flowing to the excitation inductor $L_m$. Furthermore, $i_{ds3}$ represents drain-source current of the switching element $Q_3$, and $i_{ds4}$ represents drain-source current of the switching element $Q_4$.

(i) In Case Where Switching Frequency $f_s$ is Higher Than Resonant Frequency $f_r$ (Case Illustrated in FIG. 6)

In the case where the input voltage is higher than the output voltage (in the case where the output voltage ratio is lower than or equal to 1, and here, an output voltage ratio of 1 represents the case where the output voltage is equal to a voltage obtained by rectifying and smoothing, via a transformer, a square wave generated from the input voltage using half bridge), that is, in the case where control is performed such that the switching frequency $f_s$ is made higher than the resonant frequency $f_r$, when the switching element $Q_1$ is turned on at a timing $T_0$ in the state in which the switching element $Q_2$ has already been turned off, resonant current $i_{Lr}$ having substantially a sine waveform shape of the resonant frequency $f_r$ and corresponding to the turned-on time flows to the series resonant circuit (resonant inductor $L_r$) during a period from the timing $t_0$ to a timing $t_1$ (timing at which the switching element $Q_1$ is turned off). Furthermore, excitation current $i_m$ increases linearly.

Here, immediately before the timing $t_0$, during a dead time, current having a negative value flowing to the body diode of the switching element $Q_1$ is generated. Thus, at the timing when the switching element $Q_1$ is turned on, the value of the resonant current $i_{Lr}$ is not zero but is negative (here, the direction in which current is supplied from the input side represents a positive value).

When the switching element $Q_1$ is turned on, the switching element $Q_3$ is turned on in synchronization with the turning on of the switching element $Q_1$. Accordingly, the drain-source current $i_{ds3}$ having a positive value, having substantially a sine waveform shape of the resonant frequency $f_r$ excited by the first secondary winding $L_{21}$ of the converter transformer $T_1$, and corresponding to the turned-on time flows to the switching element $Q_3$, and the conduction loss at this time is small. Here, a positive value represents current flowing from the source to the drain. In contrast, during this period, since the switching elements $Q_2$ and $Q_4$ are in the turned-off state, the drain-source current $i_{ds4}$ of the switching element $Q_4$ is 0.

Then, during the period from the timing $t_1$, at which the switching element $Q_1$ is turned off, through a dead time $t_{d1}$ to a timing $t_2$, at which the switching element $Q_2$ is turned on, following the resonant current $i_{Lr}$ generated in the period from the timing $t_0$ to the timing $t_1$, current flowing in the body diode of the switching element $Q_2$ is continuously applied to the series resonant circuit. Accordingly, after the specific dead time $t_{d1}$ has passed, the resonant current $i_{Lr}$ which has a positive value and whose value suddenly decreases flows to the series resonant circuit (resonant inductor $L_r$) until the timing $t_2$ at which the switching element $Q_2$ is turned on.

In accordance with this, during this period (from $t_1$ to $t_2$), the drain-source current $i_{ds3}$ having a positive value and following the resonant current flowing during the turned-on period of the switching element $Q_3$ flows to the switching element $Q_3$. The value of the drain-source current $i_{ds3}$ becomes 0 at the timing (timing $t_2$) at which the switching element $Q_2$ is turned on.

Then, when the switching element $Q_2$ is turned on at the timing $t_2$, during the period from the timing $t_2$ to a timing $t_3$ (timing at which the switching element $Q_2$ is turned off), resonant current $i_{Lr}$ having substantially a sine waveform shape of the resonant frequency $f_r$ obtained by inverting the positive/negative of the value of the resonant current generated during the period from the timing $t_0$ to the timing $t_1$ flows to the series resonant circuit (resonant inductor $L_r$). Furthermore, excitation current $i_m$ decreases linearly.

During the dead time $t_{d1}$, current flowing to the body diode of the switching element $Q_2$ is generated. Thus, at the timing at which the switching element $Q_2$ is turned on, the resonant current $i_{Lr}$ is not 0. As described above, with the use of the circuit configuration according to this preferred embodiment, the primary-side switching elements $Q_1$ and $Q_2$ are caused to perform ZVS (Zero Voltage Switching) operation.

The switching element $Q_4$ is turned on in synchronization with the turning on of the switching element $Q_2$. Accordingly, the drain-source current $i_{ds4}$ having a positive value, having substantially a sine waveform shape of the resonant frequency $f_r$ excited by the second secondary winding $L_{22}$ of the converter transformer $T_1$, and corresponding to the turned-on time flows to the switching element $Q_4$, and the conduction loss at this time is small. In contrast, since the switching elements $Q_1$ and $Q_3$ are in the turned-off state, the drain-source current $i_{ds3}$ of the switching element $Q_3$ is 0.

Then, during the period from the timing $t_3$, at which the switching element $Q_2$ is turned off, through a dead time $t_{d2}$ to a timing $t_4$, at which the switching element $Q_1$ is turned on, following the resonant current $i_{Lr}$ generated during the period from the timing $t_2$ to the timing $t_3$, current flowing in the body diode of the switching element $Q_1$ is continuously applied to the series resonant circuit. Accordingly, after the specific dead time $t_{d2}$ has passed, resonant current $i_{Lr}$ which has a negative value and whose value suddenly increases flows to the series resonant circuit (resonant inductor $L_r$) until the timing $t_4$ at which the switching element $Q_1$ is turned on.

In accordance with this, during this period (from $t_3$ to $t_4$), drain-source current $i_{ds4}$ having a positive value following the current flowing during the turned-on period of the switching element $Q_4$ flows to the switching element $Q_4$. The drain-source current $i_{ds4}$ becomes 0 at the timing when the switching element $Q_1$ is turned on.

(ii) In Case Where Switching Frequency $f_s$ is Equal to Resonant Frequency $f_r$ (Case Illustrated in FIG. 7)

In the case where the input voltage is equal to the output voltage (in the case where the output voltage ratio is 1), that is, in the case where a driving signal is controlled such that the switching frequency $f_s$ is made equal to the resonant frequency $f_r$, when the switching element $Q_1$ is turned on at the timing $t_0$ in the state in which the switching element $Q_2$ has already been turned off, resonant current $i_{Lr}$ corresponding to turned-on time and having substantially a sine waveform shape of the resonant frequency $f_r$ flows to the series resonant circuit (resonant inductor $L_r$) during a period from the timing $t_0$ to a timing $t_{1A}$ (timing at which the switching element $Q_1$ is turned off). In accordance with this, excitation current $i_m$ increases linearly. Here, the turned-on time of the switching element $Q_1$ is longer than the above-described case (i), in which the switching frequency $f_s$ is higher than the resonant frequency $f_r$.

Here, the switching element $Q_1$ performs a ZVS operation at the timing $t_0$, similar to the case (i).

The switching element $Q_3$ is turned on in synchronization with the turning on of the switching element $Q_1$. Accordingly, the drain-source current having a positive value, having substantially a sine waveform shape of the resonant frequency $f_r$ excited by the first secondary winding $L_{21}$ of the converter transformer $T_1$, and corresponding to the turned-on time flows to the switching element $Q_3$, and the conduction loss at this time is small. In contrast, during this period, since the switching elements $Q_2$ and $Q_4$ are in the turned-off state, the drain-source current $i_{ds4}$ of the switching element $Q_4$ is 0.

Then, during the period from the timing $t_{1A}$, at which the switching element $Q_1$ is turned off, through the dead time $t_{d1}$ to a timing $t_{2A}$, at which the switching element $Q_2$ is turned on, electric charge on the parallel capacitor (parasitic capacitance) of the switching element $Q_2$ is first discharged, and the switching element $Q_2$ is then turned on by the body diode.

On the operation conditions that the switching frequency $f_s$ should be equal to the resonant frequency $f_r$, the drain-source current $i_{ds3}$ flowing to the switching element $Q_3$ becomes 0 at the timing $t_{1A}$, and the drain-source current $i_{ds4}$ flowing to the switching element $Q_4$ starts electric conduction at the timing $t_{1A}$.

Then, when the switching element $Q_2$ is turned on before the resonant current $i_{Lr}$ comes to have a negative value, resonant current $i_{Lr}$ having substantially a sine waveform shape of the resonant frequency $f_r$ obtained by inverting the positive/negative of the value of the resonant current generated during the period from the timing $t_0$ to the timing $t_{1A}$ flows to the series resonant circuit (resonant inductor $L_r$). Furthermore, excitation current $i_m$ decreases linearly.

At this time, similar to the case (i), the switching element $Q_2$ performs a ZVS operation at the timing $t_{2A}$. As described above, with the use of the circuit configuration according to this preferred embodiment, the primary-side switching elements $Q_1$ and $Q_2$ are caused to perform ZVS operation.

The switching element $Q_4$ is turned on in synchronization with the turning on of the switching element $Q_2$. Accordingly, the drain-source current $i_{ds4}$ having a positive value, having substantially a sine waveform shape of the resonant frequency $f_r$ excited by the second secondary winding $L_{22}$ of the converter transformer $T_1$, and corresponding to the turned-on time flows to the switching element $Q_4$, and the conduction loss at this time is small. In contrast, since during this period the switching elements $Q_1$ and $Q_3$ are in the turned-off state, the drain-source current $i_{ds3}$ of the switching element $Q_3$ is 0.

Then, during the period from a timing $t_{3A}$, at which the switching element $Q_2$ is turned off, through the dead time $t_{d2}$ to a timing $t_4$, at which the switching element $Q_1$ is turned on, electric charge on the parallel capacitor (parasitic capacitance) of the switching element $Q_1$ is first charged, and the switching element $Q_1$ is then turned on by the body diode.

On the operation conditions that the switching frequency $f_s$ should be equal to the resonant frequency $f_r$, the drain-source current $i_{ds4}$ flowing to the switching element $Q_4$ becomes 0 at the timing $t_{3A}$, and the drain-source current $i_{ds3}$ flowing to the switching element $Q_3$ starts electric conduction at the timing $t_{3A}$.

(iii) In Case Where Switching Frequency $f_s$ is Lower Than Resonant Frequency $f_r$ (Case Illustrated in FIG. 8)

In the case where the input voltage is lower than the output voltage (in the case where the output voltage ratio is equal to or higher than 1), that is, in the case where a driving signal is controlled such that the switching frequency $f_s$ is lower than the resonant frequency $f_r$, when the switching element $Q_1$ is turned on at the timing $t_0$ in the state in which the switching element $Q_2$ has already been turned off, resonant current $i_{Lr}$ having substantially a sine waveform shape of the resonant frequency $f_r$ flows to the series resonant circuit (resonant inductor $L_r$) during the period from the timing $t_0$ to a timing $t_5$ (timing when a time that is half the resonant period $T_r$ of the resonant circuit has passed since the timing $t_0$). Furthermore, excitation current $i_m$ increases linearly. Furthermore, during the period from the timing $t_5$ to a timing $t_{1B}$ (timing at which the switching element $Q_1$ is turned off), current equal to the excitation current $i_m$ flows. In this case, the turned-on time of the switching element $Q_1$ is longer than the above-mentioned case (ii), in which the switching frequency $f_s$ is equal to the resonant frequency $f_r$.

Here, similar to the cases (i) and (ii), the switching element $Q_1$ performs a ZVS operation at the timing $t_0$.

Here, since the turned-on time ($T_{3onmax}$) of the switching element $Q_3$ is limited to the time that is half the resonant period $T_r$ of the series resonant circuit as described above, even when the switching element $Q_3$ is turned on in synchronization with the switching element $Q_1$, the switching element $Q_3$ is turned off at the above-mentioned timing $t_5$. That is, even if the switching period of the switching element $Q_1$ is longer than the resonant period $T_r$, the switching element $Q_3$ is turned off, without being in synchronization with the switching element $Q_1$, when the time that is half the resonant period $T_r$ has passed since the timing at which the switching element $Q_3$ is turned on.

The drain-source current $i_{ds3}$ having a positive value, having substantially a sine waveform shape of the resonant frequency $f_r$ excited by the first secondary winding $L_{21}$ of the converter transformer $T_1$ by the resonant current $i_{Lr}$, and corresponding to the turned-on time (half the resonant period $T_r$) flows to the switching element $Q_3$, and the drain-source current $i_{ds3}$ becomes 0 after the time that is half the resonant period $T_r$ has passed since the turned-on timing (at timing $t_5$).

Then, during the period from the timing $t_5$ at which the switching element $Q_3$ is turned off to the timing $t_{1B}$ at which the switching element $Q_1$ is turned off, following the resonant current $i_{Lr}$ generated during the period from the timing $t_0$ to the timing $t_5$, resonant current $i_{Lr}$ corresponding to excitation current $i_m$ flows. This is because the switching element $Q_1$ is not turned off at the timing $t_5$, which is the time when the time that is half the resonant period $T_r$ has passed since the turning on, and new current continues to be supplied from the switching element $Q_1$ to the series resonant circuit by the timing t1B (timing later than t5) determined by the switching period. In accordance with this, during the period from the timing $t_5$ to the timing $t_{1B}$ (timing at which the switching element $Q_1$ is turned off), excitation current $i_m$ (resonant current $i_{Lr}$) continues to flow as resonant current of a resonant circuit including the series resonant circuit and the excitation inductance Lm.

During this period, since the switching element $Q_3$ is in the turned-off state, the drain-source current $i_{ds3}$ of the switching element $Q_3$ is 0. Accordingly, generation of reverse current from the secondary side toward the primary side via the switching element $Q_3$, which is described as a problem of the related arts, is reliably prevented.

Then, when the switching element $Q_1$ is turned off at the timing $t_{1B}$, electric charge on the parallel capacitor (parasitic capacitance) of the switching element $Q_2$ is first discharged, and the switching element $Q_2$ is then turned on by the body diode thereof. Furthermore, the drain-source current $i_{ds4}$ flowing in the switching element $Q_4$ starts electric conduction at the timing $t_{1B}$.

During the period from the timing $t_{2B}$ to the timing $t_6$, resonant current $i_{Lr}$ having substantially a sine waveform shape of the resonant frequency $f_r$ obtained by inverting the positive/negative of the value of the resonant current generated during the period from the timing $t_0$ to the timing $t_5$ flows to the series resonant circuit (resonant inductor $L_r$). Furthermore, excitation current $i_m$ decreases linearly. Furthermore, during the period from the timing $t_6$ to a timing $t_{3B}$ (timing at which the switching element $Q_2$ is turned off), further reduced resonant current $i_{Lr}$ flows. In this case, the turned-on time of the switching element $Q_2$ is longer than the above-mentioned case (ii), in which the switching frequency $f_s$ is equal to the resonant frequency $f_r$.

Here, the switching element $Q_2$ also performs a ZVS operation at the timing $t_{2B}$, similar to the cases (i) and (ii).

Here, since the turned-on time ($T_{4onmax}$) is limited to the time that is half the resonant period $T_r$ as described above even when the switching element $Q_4$ is turned on in synchronization with turning on of the switching element $Q_2$, the switching element $Q_4$ is turned off at the above-mentioned timing $t_6$. That is, even when the switching period of the switching element $Q_2$ is longer than the resonant period $T_r$, when the time that is half the resonant period $T_r$ has passed since the turned-on timing, the switching element $Q_4$ is turned off, without being in synchronization with turning on of the switching element $Q_2$.

The drain-source current $i_{ds4}$ having a positive value, having substantially a sine waveform shape of the resonant frequency $f_r$ excited by the second secondary winding $L_{22}$ of the converter transformer $T_1$, and corresponding to the turned-on time (time that is half the resonant period $T_r$) flows to the switching element $Q_4$, and the drain-source current $i_{ds4}$ becomes 0 after the time that is half the resonant period $T_r$ has passed since the turned-on timing (timing $t_{2B}$) (at timing $t_6$ and later).

Then, during the period from the timing $t_6$ at which the switching element $Q_4$ is turned off to the timing $t_{3B}$ at which the switching element $Q_2$ is turned off, following the resonant current $i_{Lr}$ generated during the period from the timing $t_{2B}$ to the timing $t_6$, resonant current $i_{Lr}$ corresponding to excitation current $i_m$ flows. This is because the switching element $Q_2$ is not turned off at the timing $t_6$, which is the timing after the time that is half the resonant period $T_r$ has passed since the turning on of the switching element $Q_2$, and the energy stored in the series resonant circuit continues to be discharged via the switching element $Q_1$ until the timing $t_{3B}$ (timing later than the timing $t_6$), which is determined on the basis of the switching period. In accordance with this, during the period from the timing $t_6$ to the timing $t_{3B}$ (the timing at which the switching element $Q_2$ is turned off), excitation current $i_m$ (resonant current $i_{Lr}$) continues to flow as the resonant current of the resonant current including the series resonant circuit and the excitation inductance $L_m$.

During this period, since the switching element $Q_4$ is in the turned-off state, the drain-source current $i_{ds4}$ of the switching element $Q_4$ is 0. Accordingly, generation of reverse current from the secondary side toward the primary side via the switching element $Q_4$, which is described as a problem of the related arts, is reliably prevented.

As described above, with the use of the configuration according to this preferred embodiment, generation of reverse current from the secondary side toward the primary side is reliably prevented even if the switching frequency $f_s$ is lower than the resonant frequency $f_r$.

In the preferred embodiment described above, the turned-on time of each of the secondary-side switching elements $Q_3$ and $Q_4$ preferably is set to the time that is half or about half of the resonant period $T_r$, for example. However, the turned-on time of each of the switching elements $Q_3$ and $Q_4$ may be set to a specific value that is shorter than or equal to the time that is half or about half of the resonant period $T_r$. More specifically, the turned-on time of each of the switching elements $Q_3$ and $Q_4$ may be set to a specific value that is shorter than or equal to the time that is half or about half of the resonant period $T_r$ for which a variation in a resonant element constant is taken into consideration or may be set to a specific value that is shorter than or equal to the time that is half or about half of the resonant period $T_r$ after the resonant period $T_r$ is measured in a manufacturing process.

Furthermore, the switching element $Q_3$ is not necessarily turned on in synchronization with turning on of the switching element $Q_1$. Similarly, the switching element $Q_4$ is not necessarily turned on in synchronization with turning on of the switching element $Q_2$. Here, currents that should flow from the sources of the switching element $Q_3$ and the switching element $Q_4$ to the drains of the switching element $Q_3$ and the switching element $Q_4$ flow to the body diodes of the switching element $Q_3$ and the switching element $Q_4$.

Furthermore, although the MPU 11 serving as a controller is preferably arranged on the primary side so that a feedback signal is transmitted by the feedback circuit FB from the secondary side toward the primary side in the preferred embodiment described above, the MPU 11 serving as a controller may be arranged on the secondary side. In this case, a control signal for a primary-side switching element may be transmitted from the secondary side to the primary side via an insulating device such as a pulse transformer.

Figure 9:
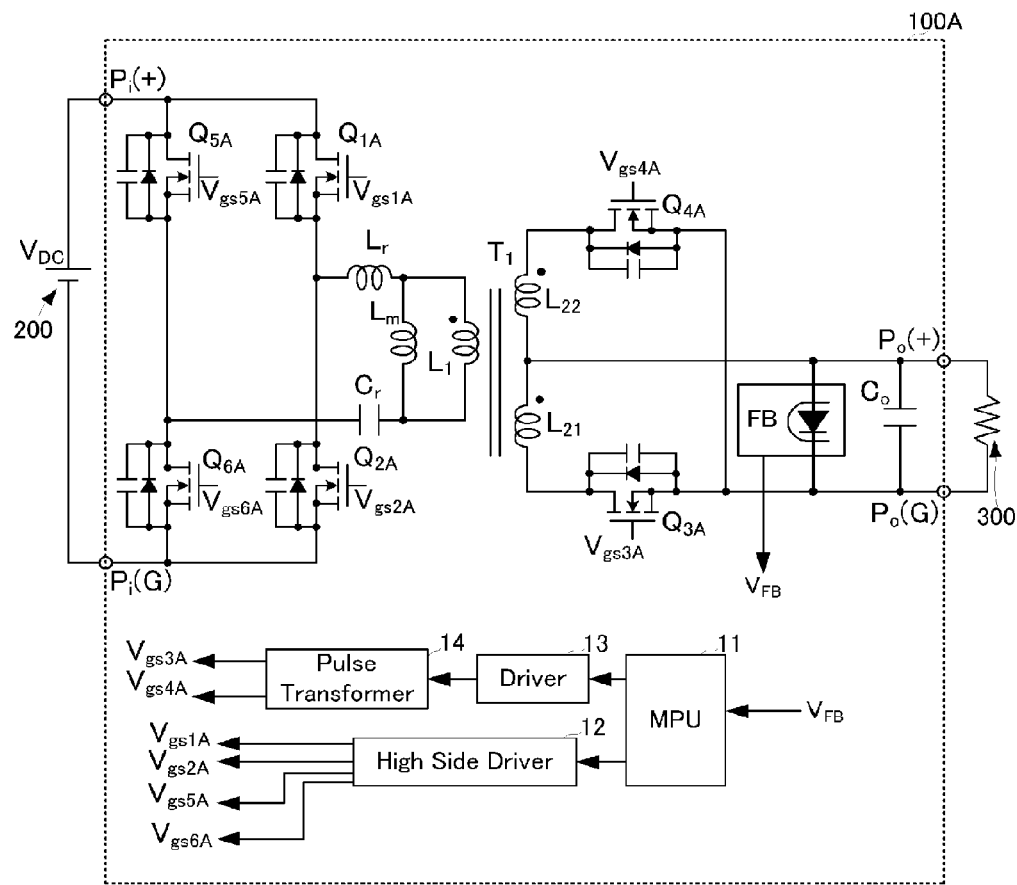
FIG. 9 is a circuit diagram of a switching power supply device 100A of a full bridge type.

Furthermore, although the example of a switching power supply device of a half bridge type is described in the foregoing preferred embodiment, a switching power supply device of a full bridge type may be used. FIG. 9 is a circuit diagram of a full-bridge switching power supply device 100A. Since the circuit configuration of the secondary side of the converter transformer $T_1$ in the switching power supply device 100A is the same as that of the switching power supply device 100 described above with reference to FIG. 3, only the circuit configuration of the primary side and the configuration of the connection between the MPU 11 and switching elements will be explained.

A series circuit including a first switching element $Q_{1A}$ and a second switching element $Q_{2a}$ is connected between a first power supply input terminal $P_i(+)$ and a second power supply input terminal $P_i(G)$. Here, the series circuit is connected between the first power supply input terminal $P_i(+)$ and the second power supply input terminal $P_i(G)$ in such a manner that the first switching element $Q_{1A}$ is arranged on the side of the first power supply input terminal $P_i(+)$ and the second switching element $Q_{2A}$ is arranged on the side of the second power supply input terminal $P_i(G)$.

Furthermore, a series circuit including a fifth switching element $Q_{5A}$ and a sixth switching element $Q_{6A}$ is connected between the first power supply input terminal $P_i(+)$ and the second power supply input terminal $P_i(G)$, in parallel to the series circuit including the first switching element $Q_{1A}$ and the second switching element $Q_{2A}$. The series circuit including the fifth switching element $Q_{5A}$ and the sixth switching element $Q_{6A}$ is connected between the first power supply input terminal $P_i(+)$ and the second power supply input terminal $P_i(G)$ in such a manner that the fifth switching element $Q_{5A}$ is arranged on the side of the first power supply input terminal $P_i(+)$ and the sixth switching element $Q_{6A}$ is arranged on the side of the second power supply input terminal $P_i(G)$.

The fifth switching element $Q_{5A}$ and the sixth switching element $Q_{6A}$, as well as the first switching element $Q_{1A}$ and the second switching element $Q_{2A}$, preferably are FET switching elements, and each preferably include a parasitic capacitor and a body diode.

The gate of each of the first switching element $Q_{1A}$, the second switching element $Q_{2A}$, the fifth switching element $Q_{5A}$, and the sixth switching element $Q_{6A}$ is connected to a high side driver 12. The high side driver 12 is connected to the MPU 11.

A series circuit including a resonant inductor $L_r$, a primary winding $L_1$ of a converter transformer $T_1$, and a resonant capacitor $C_r$ is connected between the connection point of the first switching element $Q_{1A}$ and the second switching element $Q_{2A}$, and the connection point of the fifth switching element $Q_{5A}$ and the sixth switching element $Q_{6A}$.

With this configuration, the MPU 11 controls turning on and off of the first switching element $Q_{1A}$ and the sixth switching element $Q_{6A}$ in such a manner that the first switching element $Q_{1A}$ and the sixth switching element $Q_{6A}$ are in synchronization with each other. The MPU 11 controls turning on and off of the second switching element $Q_{2A}$ and the fifth switching element $Q_{5A}$ in such a manner that the second switching element $Q_{2A}$ and the fifth switching element $Q_{5A}$ are in synchronization with each other.

The MPU 11 performs control such that turning on and off of the first switching element $Q_{1A}$ and the sixth switching element $Q_{6A}$ and turning on and off of the second switching element $Q_{2A}$ and the fifth switching element $Q_{5A}$ are complementary with each other.

Furthermore, in the case where the switching frequency $f_s$ is equal to or higher than the resonant frequency $f_r$, the MPU 11 performs control such that turning on and off of a third switching element $Q_{3A}$ and turning on and off of the first switching element $Q_{1A}$ and the sixth switching element $Q_{6A}$ are in synchronization with each other. In the case where the switching frequency $f_s$ is equal to or higher than the resonant frequency $f_r$, the MPU 11 performs control such that turning on and off of the fourth switching element $Q_{4A}$ and turning on and off of the second switching element $Q_{2A}$ and the fifth switching element $Q_{5A}$ are in synchronization with each other.

Furthermore, the MPU 11 is connected to the third switching element $Q_{3A}$ and the fourth switching element $Q_{4A}$ via a pulse transformer 14. In the case where the switching frequency $f_s$ is lower than the resonant frequency $f_r$, the MPU 11 controls turning on of the third switching element $Q_{3A}$ in synchronization with turning on of the first switching element $Q_{1A}$ and the sixth switching element $Q_{6A}$, and controls turning off of the third switching element $Q_{3A}$ after a time corresponding to the time that is half the resonant period $T_r$ has been passed. In the case where the switching frequency $f_s$ is lower than the resonant frequency $f_r$, the MPU 11 controls turning on of the fourth switching element $Q_{4A}$ in synchronization with turning on of the second switching element $Q_{2A}$ and the fifth switching element $Q_{5A}$, and controls turning off of the fourth switching element $Q_{4A}$ after a time corresponding to the time that is half the resonant period $T_r$ has passed.

Also with the above-mentioned configuration and control, reverse current from the secondary side toward the primary side is reliably prevented, similar to the above-described half bridge type.

Figure 10:
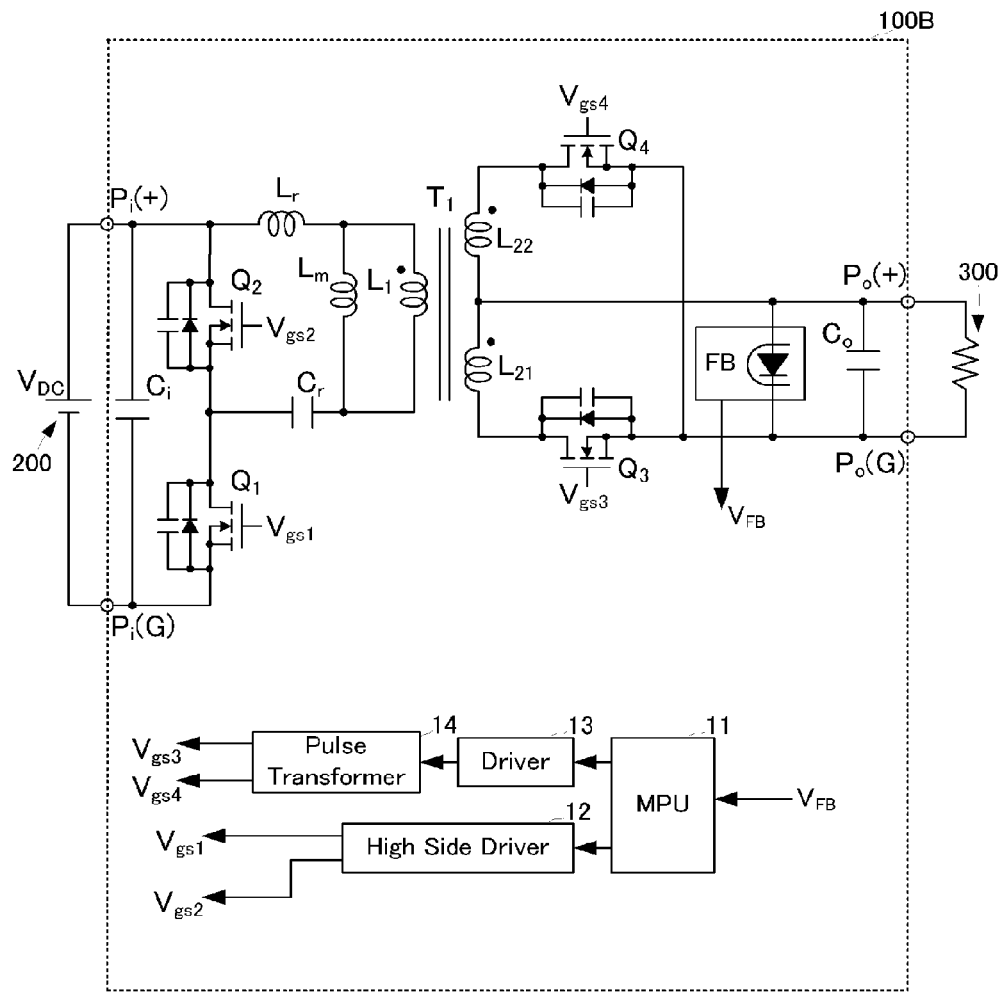
FIG. 10 is a circuit diagram of a switching power supply device 100B of a half bridge type.

FIG. 10 is a circuit diagram of a half-bridge switching power supply device 100B. The circuit configuration of the secondary side of the switching power supply device 100B is preferably the same or substantially the same as that of the switching power supply device 100 illustrated in FIG. 3. The configuration of the switching power supply device 100B is different from the configuration of the switching power supply device 100 illustrated in FIG. 3 in that a series circuit including the resonant inductor $L_r$, the primary winding $L_1$ of the converter transformer $T_1$, and the resonant capacitor $C_r$ is connected in parallel to a high-side switching element in the circuit configuration of the primary side. Also with this configuration, by performing control similar to that of the switching power supply device 100, reverse current from the secondary side toward the primary side is reliably prevented.

Figure 11:
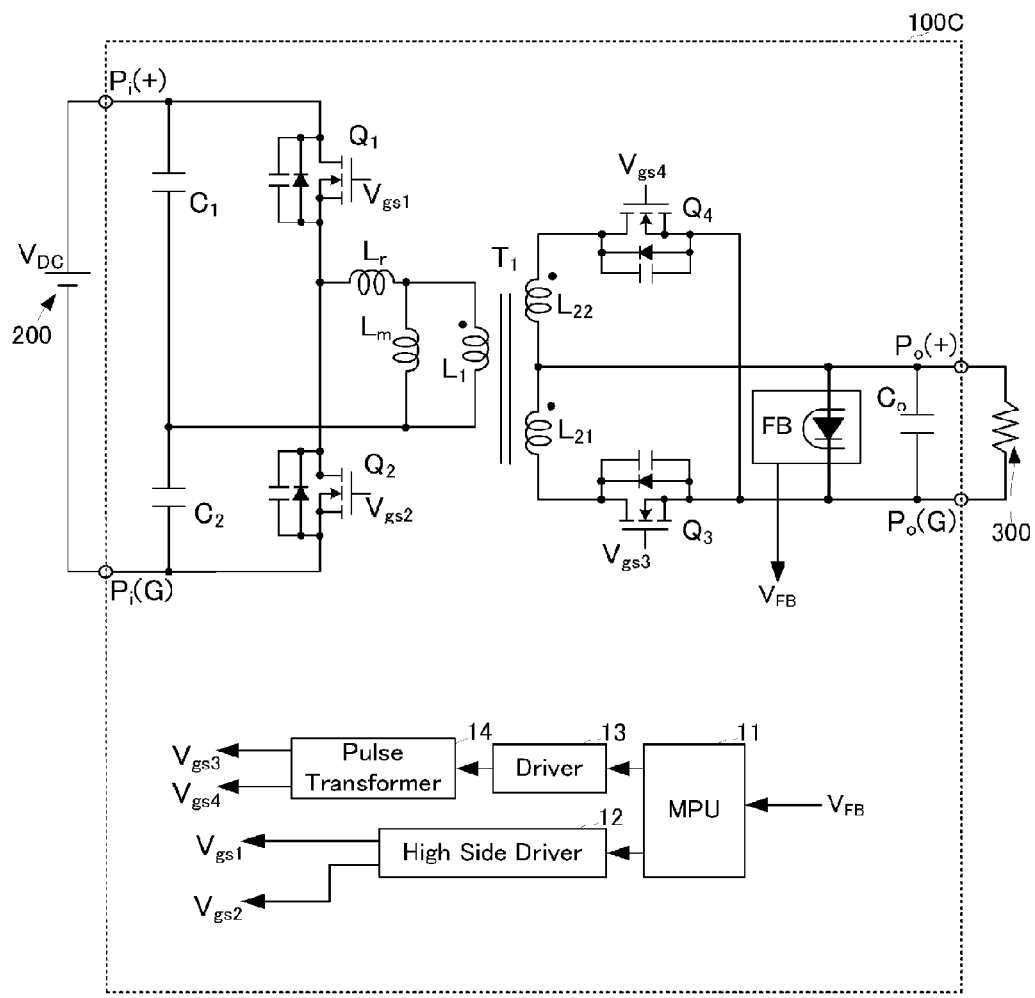
FIG. 11 is a circuit diagram of a switching power supply device 100C of a half bridge type.

FIG. 11 is a circuit diagram of a half-bridge switching power supply device 100C. The circuit configuration of the secondary side of the switching power supply device 100C is preferably the same or substantially the same as that of the switching power supply device 100 illustrated in FIG. 3. The configuration of the switching power supply device 100C is different from the configuration of the switching power supply device 100 illustrated in FIG. 3 in the circuit configuration of the primary side.

A series circuit including the first switching element $Q_1$ and the second switching element $Q_2$ is connected between the first power supply input terminal $P_i(+)$ and the second power supply input terminal $P_i(G)$. Here, the series circuit is connected between the first power supply input terminal $P_i(+)$ and the second power supply input terminal $P_i(G)$ in such a manner that the first switching element $Q_1$ is arranged on the side of the first power supply input terminal $P_i(+)$ and the second switching element $Q_2$ is arranged on the side of the second power supply input terminal $P_i(G)$.

Furthermore, a series circuit including a first capacitor $C_1$ and a second capacitor $C_2$ is connected between the first power supply input terminal $P_i(+)$ and the second power supply input terminal $P_i(G)$, in parallel to the series circuit including the first switching element $Q_1$ and the second switching element $Q_2$.

A series circuit including the resonant inductor $L_r$ and the primary winding $L_1$ of the converter transformer $T_1$ is connected between the connection point of the first switching element $Q_{1A}$ and the second switching element $Q_{2A}$, and the connection point of the first capacitor $C_1$ and the second capacitor $C_2$. Also with this configuration, by performing control similar to that of the switching power supply device 100, reverse current from the secondary side toward the primary side is reliably prevented.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching power supply device comprising:
    a converter transformer including a primary winding, a first secondary winding, and a second secondary winding;
    a series resonant circuit including a resonant inductor and a resonant capacitor that are connected in series with the primary winding;
    a first switching element and a second switching element that supply electric power to the series resonant circuit by being subject to on/off control in a complementary manner with each other;
    a third switching element that is connected in series between the first secondary winding and a voltage output terminal;
    a fourth switching element that is connected in series between the second secondary winding and the voltage output terminal; and
    a controller that is arranged and programmed to perform pulse frequency modulation control of the first switching element and the second switching element in accordance with output voltage and to control the third switching element and the fourth switching element; wherein
    the controller is arranged and programmed to handle a variable A1 determined based on a predetermined resonant period, a variable A2 generated based on the output voltage and determining a switching period, and a variable A3 that determines turned-on times of the third switching element and the fourth switching element; and
    the controller is arranged and programmed to determine the turned-on times of the third switching element and the fourth switching element based on a condition that, for a region in which A1 is greater than A2/2, A3 is equal to A2/2, and for a region in which A1 is smaller than or equal to A2/2, A3 is equal to A1.

2. The switching power supply device according to claim 1, wherein the predetermined resonant period is half or about one half of a resonant period of the series resonant circuit.

3. The switching power supply device according to claim 1, wherein
    turning on of the third switching element is in synchronization with turning on of the first switching element, the third switching element is turned off at an earlier of a time at which the second switching element is turned on or a time after half or about one half of the resonant period of the series resonant circuit has elapsed since the turning on of the third switching element; and
    turning on of the fourth switching element is in synchronization with the turning on of the second switching element, and the fourth switching element is turned off at an earlier of a time at which the first switching element is turned on or a time after half or about one half of the resonant period of the series resonant circuit has elapsed since the turning on of the fourth switching element.

4. The switching power supply device according to claim 1, further comprising a parallel inductor that is connected in parallel to the primary winding.

5. The switching power supply device according to claim 1, wherein the controller includes:
    a microprocessor that performs the pulse frequency modulation control based on the output voltage; and
    a driver circuit that generates a driving signal for each of the switching elements, based on driving information for the respective switching element that is acquired from the microprocessor.

6. The switching power supply device according to claim 1, wherein
    the first switching element and the second switching element are connected in series between first and second power supply input terminals that define a pair of terminals to which direct current voltage is input; and
    a primary side of the converter transformer is configured to be a half bridge type by a parallel connection of the series resonant circuit to one of the first switching element and the second switching element.

7. The switching power supply device according to claim 1, wherein
    the first switching element and the second switching element are connected in series between first and second power supply input terminals that define a pair of terminals to which direct current voltage is input;
    a first capacitor and a second capacitor are connected in series between the first and second power supply input terminals, in parallel to a series circuit including the first switching element and the second switching element; and
    the series resonant circuit is provided and a primary side of the converter transformer is configured to be a half bridge type by a connection of the primary winding and the resonant inductor between a connection point of the first switching element and the second switching element, and a connection point of the first capacitor and the second capacitor.

8. The switching power supply device according to claim 1, wherein
    the first switching element and the second switching element are connected in series between first and second power supply input terminals that define a pair of terminals to which direct current voltage is input;
    a fifth switching element and a sixth switching element are connected in series between the first and second power supply input terminals, in parallel to a series circuit including the first switching element and the second switching element; and the series resonant circuit is provided and a primary side of the converter transformer is configured to be a full bridge type by a connection of the primary winding and the resonant inductor between a connection point of the first switching element and the second switching element, and a connection point of the fifth switching element and the sixth switching element.

9. The switching power supply device according to claim 1, wherein each of the first switching element and the second switching element is a FET switching element and includes a parasitic conductor and a body diode.

10. The switching power supply device according to claim 1, wherein each of the third switching element and the fourth switching element is a FET switching element and includes a parasitic conductor and a body diode.

11. The switching power supply device according to claim 1, wherein the first and second switching elements are arranged and controlled to perform zero voltage switching.

12. The switching power supply device according to claim 1, wherein turning on of the third switching element is not in synchronization with turning on of the first switching element.

13. The switching power supply device according to claim 1, wherein turning on of the fourth switching element is not in synchronization with turning on of the second switching element.

14. The switching power supply device according to claim 5, wherein the microprocessor is provided on a primary side of the converter transformer such that a feedback signal is transmitted from a secondary side of the converter transformer to the primary side.

15. The switching power supply device according to claim 5, wherein the microprocessor is provided on a secondary side of the converter transformer.

16. The switching power supply device according to claim 1, where the switching power supply device has a half bridge configuration.

17. The switching power supply device according to claim 1, where the switching power supply device has a full bridge configuration.

18. The switching power supply device according to claim 8, wherein each of the fifth switching element and the sixth switching element is a FET switching element and includes a parasitic conductor and a body diode.

* * * * *